Figure 1:
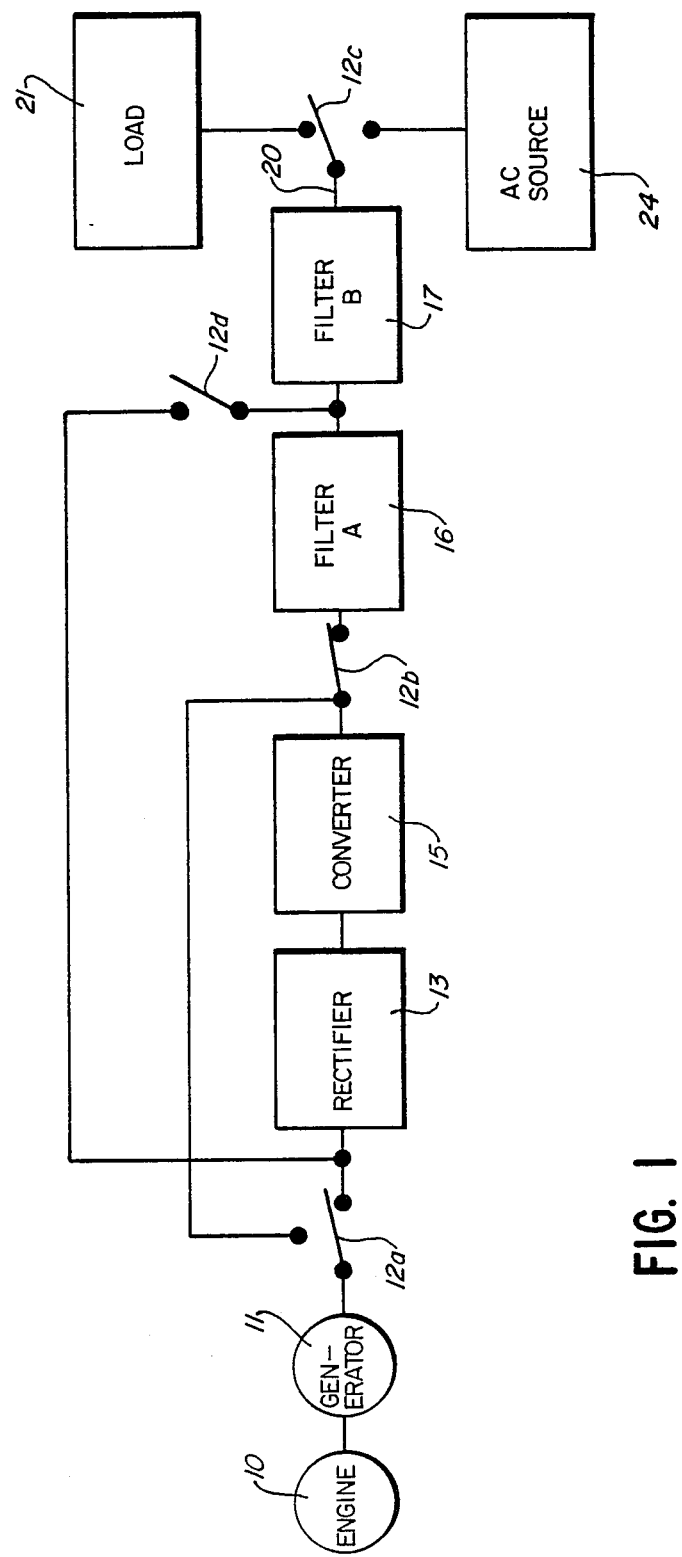

United States Patent [19]
Cook

[11] Patent Number: 4,862,341
[45] Date of Patent: Aug. 29, 1989

[54] FILTER FOR VARIABLE SPEED, CONSTANT FREQUENCY ELECTRICAL SYSTEM

[75] Inventor: Alexander Cook, Rockford, Ill.

[73] Assignee: Sundstrand Corporation, Rockford, Ill.

[21] Appl. No.: 265,951

[22] Filed: Nov. 2, 1988

[51] Int. Cl.[4] .............................................. H02M 5/45
[52] U.S. Cl. ...................................... 363/37; 363/39; 322/10; 322/12; 322/58; 290/36 R; 290/38 R
[58] Field of Search ................. 363/35, 37, 39, 45–48, 363/174–176; 322/10, 11, 12, 58; 290/32, 36 R, 38 R, 46; 318/430; 307/102, 105

[56] References Cited

U.S. PATENT DOCUMENTS

| | | | |
|---|---|---|---|
| 3,290,578 | 12/1966 | Ainsworth | 363/39 |
| 3,461,372 | 8/1969 | Pickup et al. | 363/40 |
| 3,555,291 | 1/1971 | Dewey | 307/105 |
| 3,577,059 | 5/1971 | Kelley | 363/48 |
| 3,746,963 | 7/1973 | VeNard | 363/37 |
| 3,813,593 | 5/1974 | Tice et al. | 322/58 |
| 3,908,130 | 9/1975 | Lafuze | 290/46 |
| 4,330,743 | 5/1982 | Glennon | 322/10 |
| 4,481,459 | 11/1984 | Mehl et al. | 322/10 |
| 4,695,939 | 9/1987 | Canay | 322/58 |
| 4,739,464 | 4/1988 | Nishihiro et al. | 363/37 |

OTHER PUBLICATIONS

SAE Technical Paper Series 871887, Aerospace Technology Conference and Exposition, Long Beach, Calif., Oct. 5–8, 1987.

*Primary Examiner*—Peter S. Wong
*Attorney, Agent, or Firm*—Wood, Dalton, Phillips, Mason & Rowe

[57] ABSTRACT

A variable speed, constant frequency electrical generating system has a variable speed, engine driven generator. The system operates in either a generate or an engine start mode. A bidirectional filter connected between the rectifier-converter and the AC bus traps or blocks switching harmonics from the rectifier-converter. Shunt trap circuits are connected either phase-to-phase or phase-to-neutral.

7 Claims, 2 Drawing Sheets

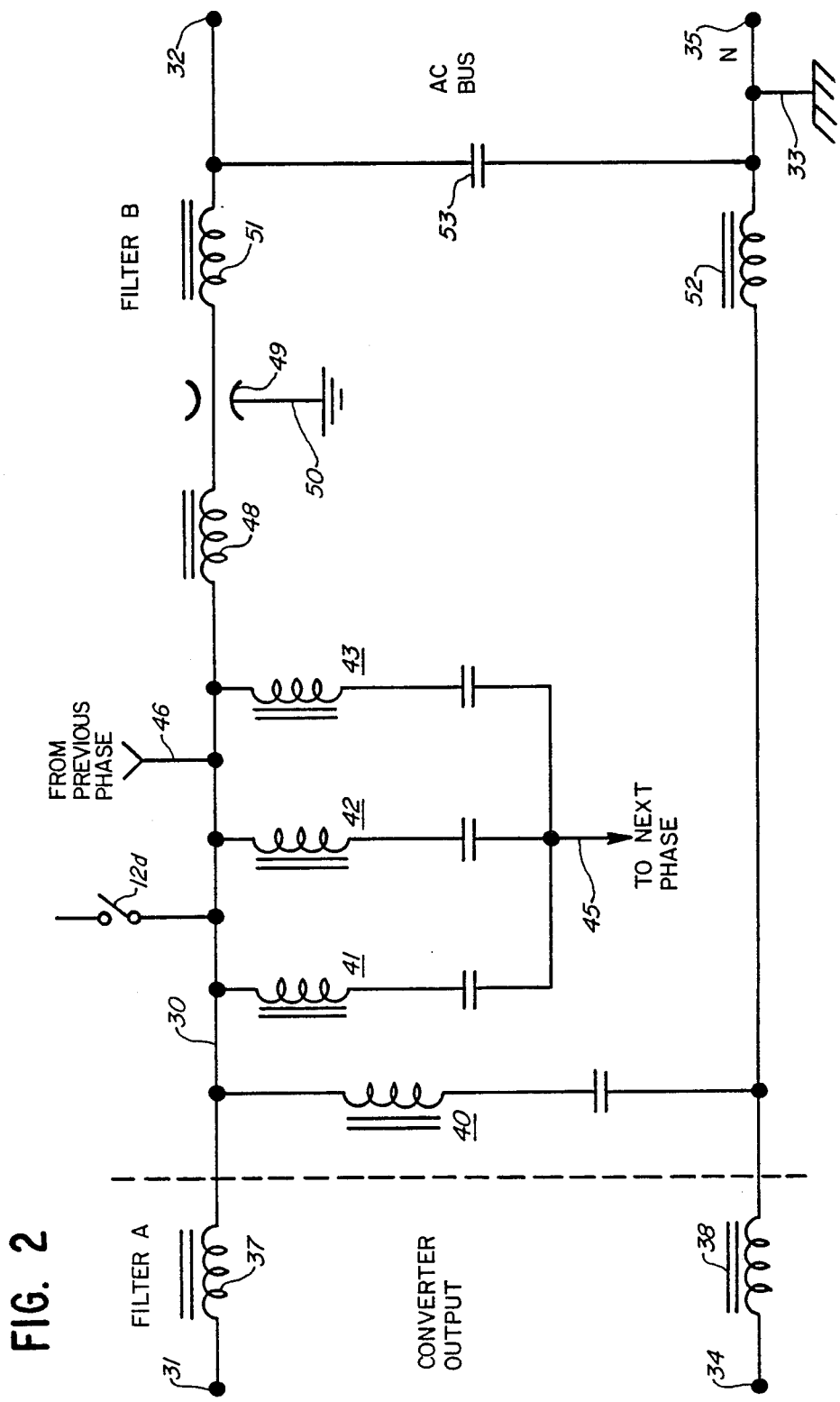

FILTER FOR VARIABLE SPEED, CONSTANT FREQUENCY ELECTRICAL SYSTEM

This invention relates to a converter output filter for a variable speed, constant frequency electrical system.

BACKGROUND OF THE INVENTION

Variable speed, constant frequency electrical generating systems are used with variable speed prime movers to provide constant frequency electrical power to loads. A prime mover is connected with a variable speed generator. The variable frequency output of the generator is rectified and the DC powers a fixed frequency, solid state converter. A filter circuit smooths the output of the converter and traps switching harmonics.

Such electrical systems are particularly adapted for use with an aircraft engine where the generator is driven directly by the engine and the inverter has a 400 Hz output. It is also known to connect the AC to AC converter with another power source and to operate the variable frequency generator as a variable speed motor, driving the engine to starting speed in an engine start mode.

BRIEF SUMMARY OF THE INVENTION

This invention is concerned with a bidirectional filter for the rectifier-converter in a three phase two mode generate-start system.

One feature of the invention is that a three phase filter connected with the converter has a plurality of shunt trap circuits, at least one of the shunt trap circuits being connected from phase-to-phase and at least one other o the shunt trap circuits being connected from phase-to-neutral.

Another feature of the invention is that the filter includes a high frequency blocking circuit as a series connected inductor and a shunt connected feed through capacitor.

Yet another feature is that the series inductor of the high frequency blocking circuit or of a smoothing filter includes a section in series with the phase conductor and a section in series with the neutral conductor.

Further features and advantages of the invention will readily be a from the following specification and from the drawings, in which:

FIG. 1 is a block diagram of a two mode VSCF system with a bidirectional filter; and FIG. 2 is a schematic of a filter for one phase of the three phase system.

The power system disclosed will be described as embodied in an aircraft having a variable speed engine driving a generator. The output of the generator is rectified and powers a converter with a 400 Hz, three phase output. The system can be used with other variable speed engines and in electrical systems of other frequencies.

The system is illustrated in FIG. 1 connected for operation in the generate mode. Engine 10 is mechanically coupled with generator 11 which has a three phase output connected through double throw section 12a of a mode switch with the input of rectifier 13 which may, for example, have two half wave three phase rectifiers supplying positive and negative rails (not shown). Converter 15 has its input connected with the output of rectifier 13. The converter may, for example, be a solid state, three phase pulse modulated inverter circuit with a three phase wye connected output. A neutral conductor (not shown in FIG. 1) is preferably connected with the neutral terminal of a three phase, wye connected coupling transformer as shown in Krinickas Ser. No. 267,177 filed Nov. 4, 1988 and assigned to the assignee of this application. The converter output is coupled through single throw mode switch section 12b with filters A 16 and B 17 and to the aircraft electrical bus 20. Double throw section 12c of the mode switch connects the electrical bus with system loads 21.

In a typical 100 kw electrical system for a modern jet aircraft, the engine-prime mover has an operating speed range of 18,000–30,000 rpm. The output frequency of the generator 21 ranges from 1228 Hz to 2014 Hz with a voltage of 160–210 volts. The three phase output of the converter is nominally 120 volts at a frequency of 400 Hz.

In the engine start mode the four sections 12a–d of the mode switch reverse their positions. An AC source, which in an aircraft may be ground power, an auxiliary power unit or another engine driven generator in a multi engine aircraft, is connected through switch section 12c and electrical bus 20 with the output of filter B 17. The input of filter B is connected through single throw section 12d of the mode switch with the input of rectifier 13. Power from the AC source is rectified and operates converter 15 which, in the start mode is controlled to provide a variable frequency and a variable voltage based on engine speed. The output of converter 15 is connected through mode switch section 12a with generator 11 which, during start, operates as a motor. Switch section 12b is open. Generator 11 drives the engine 10 in accordance with a desired speed-time or acceleration program from stand still to starting speed. Details of a suitable converter control may be found in Rozman et al. application Ser. No. 270,625 filed Nov. 14, 1988 assigned to the assignee of this application.

The sections 12a–d of the mode switch are shown as single pole switches in FIG. 1. In the three phase system of the preferred embodiment of the invention the switches have three poles. The neutral conductor in a three phase system is not switched, in the normal aircraft buswork.

Sections A and B of the filter, for a single phase, are shown in FIG. 2. Identical filters are provided for the other phases.

Phase conductor 30 is connected at 31 with the output of converter 15 and at 32 with AC bus 20. The neutral conductor N is common to all three phases and is connected with a reference or ground 33. Terminal 34 of neural conductor N is connected with a system neutral point as, for example, the neutral junction of the windings of wye connected transformer of Krinickas Ser. No. 267,177, supra. Terminal 35 is connected with the neutral conductor of the AC bus.

Filter A has a series connected smoothing inductor which limits ripple current from the converter. The inductor is preferably in the form of two inductor sections 37, 38 connected in series in the phase and neutral conductors 30, N, respectively. In a balanced system the fundamental current in the neutral conductor N is virtually zero, although harmonics may be substantial. With the split inductor sections the undesirable harmonic currents are blocked or smoothed while power loss at the fundamental frequency is minimized.

Filter B has a plurality of shunt connected trap circuits 40, 41, 42 and 43. Each trap has a series connected inductor and capacitor which are series resonant at a selected harmonic of the fundamental or convertor operating frequency. Trap circuit 40 is connected between phase conductor 30 and neutral conductor N. Trap circuits 41, 42 and 43 are connected from the phase conductor 30 to the phase conductor of the next phase (not shown) at 45. Similarly, trap circuits from the previous phase (not shown) are connected with phase conductor 30 at 46. The combined filter, sections A and B, has an initial two-pole roll off.

The nature of the switching harmonics from a rectifier-converter depend on the rectifier-converter circuit design. The trap circuit frequencies and connections are selected to minimize the predominant harmonics Some switching harmonics are in phase with the phase voltage. A trap circuit for an in-phase harmonic is connected from the phase conductor to the neutral conductor. Other harmonics are shifted 120° from the phase voltage. Such an harmonic is effectively filtered by connecting the trap circuit between phase conductors. In a specific converter, trap circuit 40 connected from phase conductor 30 to neutral conductor N is tuned to the fifteenth harmonic. Trap circuits 41, 42 and 43 connected between phase conductors are tuned to the fifth, seventh and seventeenth harmonics.

Higher frequency harmonics from the rectifier-converter which are of lesser amplitude than the harmonics for which the shunt trap circuits are tuned, may cause significant and undesirable electromagnetic interference (EMI) if they are present on the AC bus 20. Series inductor 48 together with feed through capacitor 49, series inductor 51, 52 split between the phase inductor 30 and neutral conductor N and shunt connected output capacitor 53 attenuate these high frequencies and minimize the switch induced interference radiated from the aircraft electrical bus. Feed through capacitor 49 returns high frequency harmonics to converter 15 through a chassis ground 50. Use of a feed through capacitor 49 with a direct chassis ground, rather than a capacitor with wire leads or terminals, minimizes radiation.

In the generate mode of the system, the filter sections A and B are connected between the output of converter 15 and the AC bus 20, minimizing the harmonic signals which reach the bus. In the start mode of operation filter section B is connected between the AC bus 20, which is connected to AC source 24, and the input of rectifier 13. Again, higher harmonic frequencies from the rectifier 13 and the converter 15 are trapped or blocked and do not appear on the AC bus 20.

I claim:
1. In a power system
having a variable speed engine,
a three phase electrical machine connected with said engine,
a rectifier having an input and an output,
a converter having an input connected to the output of the rectifier and a three phase output, and
a filter for converter switching frequencies, the filter having three sections, one for each phase and the filter having an input and an output, the power system having
a generate mode of operation in which the engine drives the machine to generate variable frequency alternating electrical power, with the input of the rectifier connected with the electrical machine and the inverter having a three phase alternating output, with neutral, connected with an electrical bus, and
an engine start mode of operation in which the input of the rectifier is connected with a three phase electrical source and the output of the inverter is connected with the machine, the machine driving the engine,
means operative in the generate mode of the power system connecting the input of said filter with the output of said inverter and connecting the output of the filter with said electrical bus, and
means operative in the engine start mode of the power system connecting the input of said filter with the input of said rectifier and connecting the output of the filter with said electrical source, the filter blocking switching frequencies from the electrical bus and the electrical source in the generate and start modes of operation, respectively, the improvement in which each section of said filter includes:
a plurality of shunt trap circuits, at least one of said shunt trap circuits being connected from phase-to-phase and at least one other of said shunt trap circuits being connected from phase-to-neutral.

2. The power system of claim 1 in which said filter includes a high frequency blocking circuit 3. The power system of claim 2 in which said high frequency blocking circuit includes a series connected inductor and a shunt connected capacitor.

4. The power system of claim 3 in which said shunt capacitor is a feed through capacitor connected from the phase conductor to ground.

5. The power system of claim 3 in which said series inductor has two sections, one in series with the phase conductor and the other in series with the neutral conductor.

6. The power system of claim 1 including a smoothing inductor connected between the shunt trap circuits and the converter in the generate mode of the system.

7. The power system of claim 6 in which said smoothing inductor includes a section in series with the phase conductor and a section in series with the neutral conductor.

* * * * *